Feb. 21, 1933.  A. Y. DODGE  1,898,294
OPERATING CONNECTION
Filed March 28, 1929

INVENTOR.
Adiel Y. Dodge
BY
M. W. McConkey
ATTORNEY

Patented Feb. 21, 1933

1,898,294

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

OPERATING CONNECTION

Application filed March 28, 1929. Serial No. 350,502.

This invention relates to operating mechanism for brakes or the like, and is illustrated as embodied in a novel front brake control or operating device. An object of the invention is to facilitate the adjustment of the brake or its equivalent, for example to compensate for wear, preferably by simplifying the manner of adjusting a lever on a shaft. Various features of novelty relate to predetermining the release movement of the device after forcibly applying it, and to the mechanical structure of the parts to permit the desired semi-automatic adjustment.

The above and other objects and features of the invention, including various novel and desirable details of construction, will be apparent from the following description of the illustrative embodiment shown in the accompanying drawing, in which.

Figure 1:
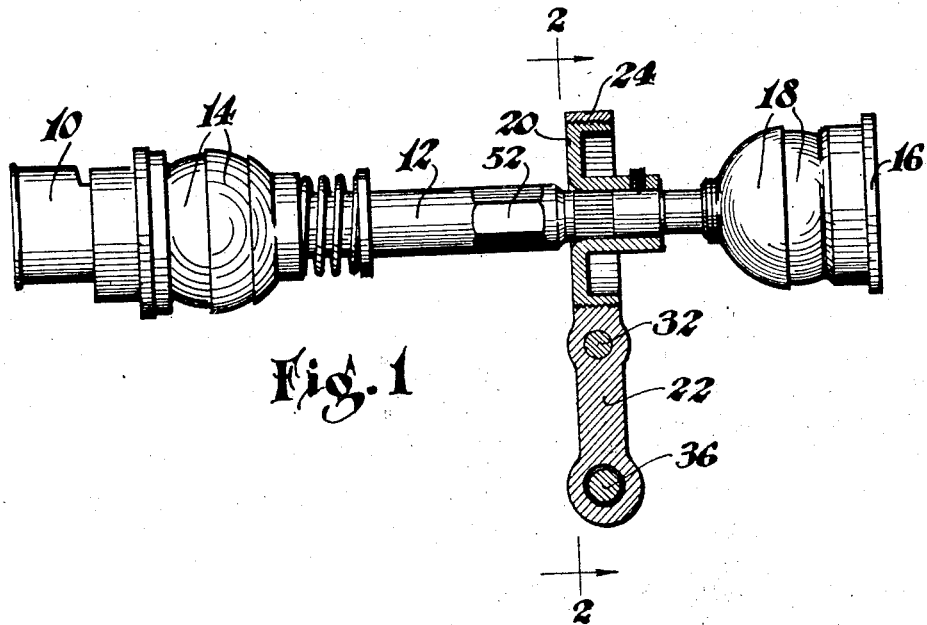
Figure 1 is a view of my novel front brake control, with the connection between the shaft and lever shown in vertical section.

In the arrangement selected for illustration, the brake is applied by means such as a cam 10, by a shaft 12 connected to the cam through a suitable universal joint in a housing 14, and supported on the chassis frame 16 by any suitable device 18 permitting slight axial movements of the shaft as the frame moves up and down when the vehicle springs are flexed.

The shaft preferably has an operating part, such as a cylindrical drum 20 preferably formed with an external thread or series of peripheral grooves, and which is secured to the shaft in any desired manner. This part 20 is shown as a steel or brass stamping.

An operating lever 22 is provided with a friction strap 24, preferably threaded or grooved to mesh with the threads or grooves on part 20, and which embraces part 20. One end of strap 24 is fixedly secured by means such as a rivet or screw 26, while the other end is yieldingly held by means such as a spring washer 28 held by a nut 30 on a bolt 32 passing through the lever.

Figure 3:
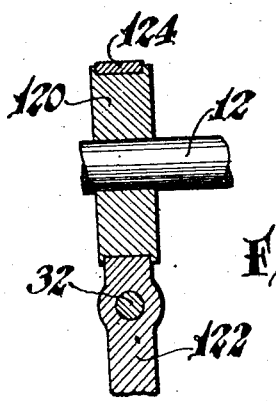
Figure 3 is a section, corresponding to part of Figure 1, but showing a modified connection.

In Figure 3, the strap 124 and drum 120 are shown with plane friction surfaces instead of with threads or grooves. The threads or grooves of Figure 1 may be regarded as in effect a series of small cone clutches frictionally gripping lever 22 to the shaft 12.

Figure 2:
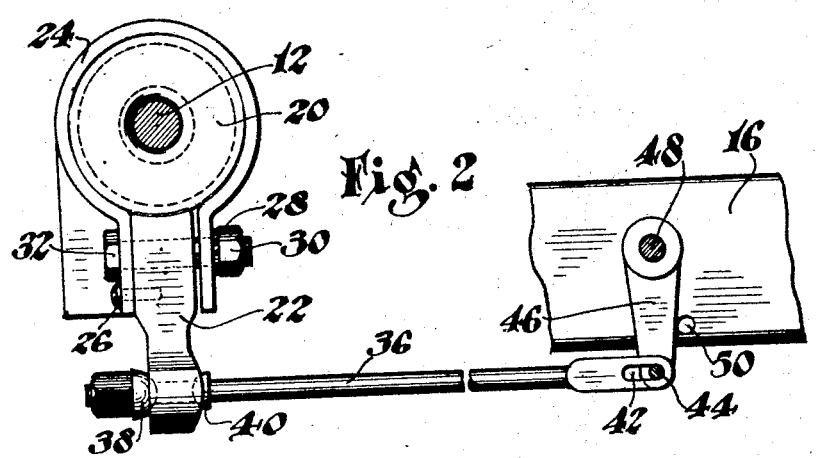
Figure 2 is a section on the line 2—2 of Figure 1, showing the connection in side elevation.

In both arrangements, it will be seen that moving lever 22 to the right in Figure 2, which is in a brake-applying direction, causes strap 24 to have a "wrapping" or clutching action and firmly holds lever 22 in place on the shaft. In the other direction of movement, strap 24 has an "unwrapping" tendency, and the lever can be shifted on the shaft by applying a little force. Thus strap 24 in effect forms a one-way clutch between the lever and the shaft.

Lever 22 is connected at its end to a link 36, which preferably has spherically-surfaced nuts 38 and 40 seated in corresponding sockets in opposite sides of the lever. Link 36 has at its rear end a slot 42, of predetermined length, embracing a pivot 44 on an arm 46 fixed to an operating shaft 48. If preferred, arm 46 may be an idler lever connected by any suitable means to the operating shaft. Adjacent arm 46, frame 16 has an opening 50, into which a pin or stop may be inserted when desired to prevent movement of arm 46 in a brake-applying direction.

When it is desired to adjust the brake, a pin or stop is inserted in opening 50 while the brake is released, and a wrench is applied to a polygonal portion 52 of shaft 12. The wrench is then turned forcibly, fully to apply the brake, which action serves to make the desired adjustment, whereupon the wrench and the stops are removed.

When the wrench is operated as described, to turn the shaft 12, lever 22 turns with the shaft until the forward end of slot 42 engages the pivot pin 44, the latter being held immovable by the stop in opening 50. Further turning of the shaft by the wrench, with lever 22 now held stationary, causes the shaft and drum 20 to turn within the strap 24, this being permitted by the "unwrapping" tendency of the strap due to movement in this direction, thus shifting the lever on the shaft to a new or adjusted position.

Now when the brake is released, the shaft and lever can only move a predetermined distance in a brake-releasing direction, until the right end of slot 42 again engages the pivot pin 44. Thus cam 10 is held partly turned, at such an angle that the brake shoes are allowed to move away from the drum only far enough to prevent dragging.

While certain illustrative constructions have been described in detail, it is not my intention to limit the scope of the invention to those particular constructions, or otherwise than by the terms of the appended claims.

I claim:

1. An adjustable operating connection for a brake or the like comprising, in combination, a shaft, a lever having a one-way clutching connection to the shaft, and means for permitting the lever a predetermined movement with the shaft when the shaft is turned forcibly in a brake-applying direction and then holding the lever while the shaft is turned further into fully applied position.

2. An adjustable operating connection for a brake or the like comprising, in combination, two operating members having a one-way shiftable connection, and means for permitting one member a predetermined movement with the other when said other is moved forcibly in a brake-applying direction and then holding said one member while the other is moved further into fully applied position.

3. Operating mechanism for a brake or the like comprising, in combination, a brake-applying member, an operating member connected to actuate the applying member when moved in one direction and shiftable thereon in the other direction, and means for holding said operating member and causing it to shift with relation to the applying member when the applying member is moved beyond a predetermined limit.

4. Operating mechanism for a brake or the like comprising, in combination, a member movable to apply the brake, an operating member therefor and connected thereto, and means for shifting the connection between said members during movement thereof in a brake-applying direction when the applying member is moved to fully-applied position so that there will be a predetermined release movement only.

5. Operating mechanism for a brake or the like comprising, in combination, a shaft, a lever having a one-way connection to the shaft, and means arranged to be set to limit the movement of the lever in one direction and cause it to shift on the shaft.

6. Operating mechanism for a brake or the like comprising, in combination, a shaft, a lever having a one-way connection to the shaft, and a stop adapted to be set to limit the movement of the lever in one direction to a predetermined maximum and cause it thereafter to shift on the shaft.

7. Operating mechanism for a brake or the like comprising, in combination, a shaft having a relatively large cylindrical part, and an operating lever having a strap embracing and having a one-way connection with said part, together with an operating member connected to said lever and means for arresting motion of said member and the lever after a predetermined degree of movement while the strap shifts with respect to the shaft as the shaft continues to turn.

8. Operating mechanism for a brake or the like comprising, in combination, a shaft having a lever-engaging part, and an operating lever having a strap embracing and having a one-way connection with said part, together with an operating member connected to said lever and means for arresting motion of said member and the lever after a predetermined degree of movement while the strap shifts with respect to the shaft as the shaft continues to turn.

9. Operating mechanism for a brake or the like comprising, in combination, a shaft having a lever-engaging part, and an operating lever having a strap embracing and frictionally gripping said part and which is arranged to have a wrapping grip on said part when the lever is moved in one direction and to be shiftable on said part in the other direction, together with an operating member connected to said lever and means for arresting motion of said member and the lever after a predetermined degree of movement while the strap shifts with respect to the shaft as the shaft continues to turn.

10. Operating mechanism for a brake or the like comprising, in combination, a shaft having a lever-engaging part, and an operating lever having a strap embracing and frictionally gripping said part and which is fixedly secured at one end and yieldingly held at the other end, together with an operating member connected to said lever and means for arresting motion of said member and the lever after a predetermined degree of movement while the strap shifts with respect to the shaft as the shaft continues to turn.

In testimony whereof, I have hereunto signed my name.

ADIEL Y. DODGE.